(12) United States Patent
Courtney et al.

(10) Patent No.: US 11,380,191 B2
(45) Date of Patent: Jul. 5, 2022

(54) SYSTEM AND METHOD FOR DETERMINING THE LOCATION AND/OR RELATIVE ENVIRONMENT OF A CONTROLLING DEVICE

(71) Applicant: Universal Electronics Inc., Santa Ana, CA (US)

(72) Inventors: Michael Courtney, Santa Ana, CA (US); Jeremy Mickelsen, Santa Ana, CA (US); Khanh Nguyen, Santa Ana, CA (US); Haiming Huang, Santa Ana, CA (US); Jan van Ee, Santa Ana, CA (US); Lokanath Penukonda, Irvine, CA (US); Jesus Perez, Costa Mesa, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 16/809,281

(22) Filed: Mar. 4, 2020

(65) Prior Publication Data
US 2021/0280052 A1    Sep. 9, 2021

(51) Int. Cl.
*G08C 17/02*      (2006.01)
*H04W 84/18*     (2009.01)

(52) U.S. Cl.
CPC ......... *G08C 17/02* (2013.01); *G08C 2201/32* (2013.01); *G08C 2201/92* (2013.01); *H04W 84/18* (2013.01)

(58) Field of Classification Search
None
See application file for complete search history.

(56) References Cited

U.S. PATENT DOCUMENTS

| 8,180,373 | B2 * | 5/2012 | de Clerq | H04W 4/029 455/456.1 |
| 2016/0358459 | A1 * | 12/2016 | Singhar | H04W 4/021 |

OTHER PUBLICATIONS

ISA/US, Int. Search Report and Written Opinion issued on PCT application No. PCT/US21/18996, dated Mar. 26, 2021, 8 pages.

\* cited by examiner

*Primary Examiner* — Adolf Dsouza
(74) *Attorney, Agent, or Firm* — Greenberg Traurig, LLP

(57) ABSTRACT

A radio frequency connection between a controlling device and a one of a plurality of controllable appliances in an environment is used to determine when the controlling device is pointing more towards the one of the plurality of controllable appliances relative to remaining ones of the plurality of controllable appliances. When it is determined that the controlling device is pointing more towards the one of the plurality of controllable appliances relative to remaining ones of the plurality of controllable appliances, the controlling device automatically makes active a command codeset usable to transmit commands to command functional operations of the one of the plurality of controllable appliances.

10 Claims, 3 Drawing Sheets

SYSTEM AND METHOD FOR DETERMINING THE LOCATION AND/OR RELATIVE ENVIRONMENT OF A CONTROLLING DEVICE

BACKGROUND

Various systems and methods for determining the location of a controlling device within an environment and/or for determining the controllable appliances that are within the environment are known in the art. For example, U.S. Pat. No. 8,180,373 ("the '373 patent"), the disclosure of which is incorporated herein by reference in its entirety, describes example systems that includes a controlling device (such as a wireless, universal remote control), one or more location signaling devices, and multiple control environments. Each control environment includes one or more home appliances operable by use of the controlling device and each control environment may be further segmented into control zones.

While systems such as those described in U.S. Pat. No. 8,180,373 perform adequately when simple location based determinations are desired, a need exists for a more precise location based system.

SUMMARY

In accordance with this and additional needs and desires, the following generally describes systems and methods for determining the location and/or relative environment of a controlling device.

A better understanding of the objects, advantages, features, properties and relationships of the subject systems and methods will be obtained from the following detailed description and accompanying drawings which set forth illustrative embodiments which are indicative of the various ways in which the principles of the systems and methods may be employed.

BRIEF DESCRIPTION OF THE DRAWINGS

For a better understanding of the systems and methods described hereinafter, reference may be had to preferred embodiments shown in the following drawings in which.

DETAILED DESCRIPTION

With reference to the figures, a system and method is described for determining a location and/or an environment of a controlling device where the environment of the controlling device may include one or more controllable appliances.

In one described, example system, a controlling device will auto-adapt to new situations that are inherently unknowable ahead of time, such as when a user moves the controlling device from a first location, within a first environment having at least a first controllable appliance, to a second location, within a second environment having at least a second controllable appliance that is different in either make, model, or type from the first controllable appliance. In this example, the controlling device will auto-adapt to the new location and environment by utilizing a "Bluetooth" low energy (BLE) mesh network to find out what controllable appliance(s) is within the new environment whereupon the controlling device may auto-populate a display with command user interface elements for the located controllable appliance(s). As will be appreciated, an advantage of this system is that the controlling device does not have to be pre-programmed with all possible environmental scenarios. Rather, the controlling device can adapt the commands (that are to be transmitted to the device(s) within the environment) and what is presented in the display/user interface of the controlling device to the options in the environment in which the controlling device is located. Also, if a controllable appliance is moved or replaced within an environment, the system may be used to ensure that the controlling device will continue to be operable to issue appropriate commands to the controllable appliances within the environment.

In a further described, example system, the controlling device is adapted to be a connection-less controlling device that will be usable to control one or multiple BLE devices at once without requiring a BLE link connection. For example, in a case where multiple BLE devices are present in an environment, a user can choose to control a particular BLE device by pointing the controlling device toward that particular BLE device. Since this controlling device will not need to maintain a BLE link, this example system can potentially reduce power consumption and thus increase battery life.

In a still further described, example system, a device within an environment, which is preferably a controllable device, comprises a security camera that can fit into a BLE mesh network. The security camera will be adapted to provide varying levels of still photos and videos, depending on the bandwidth available to the system. The security camera may also be adapted to support other members of the BLE mesh network.

Figure 1:
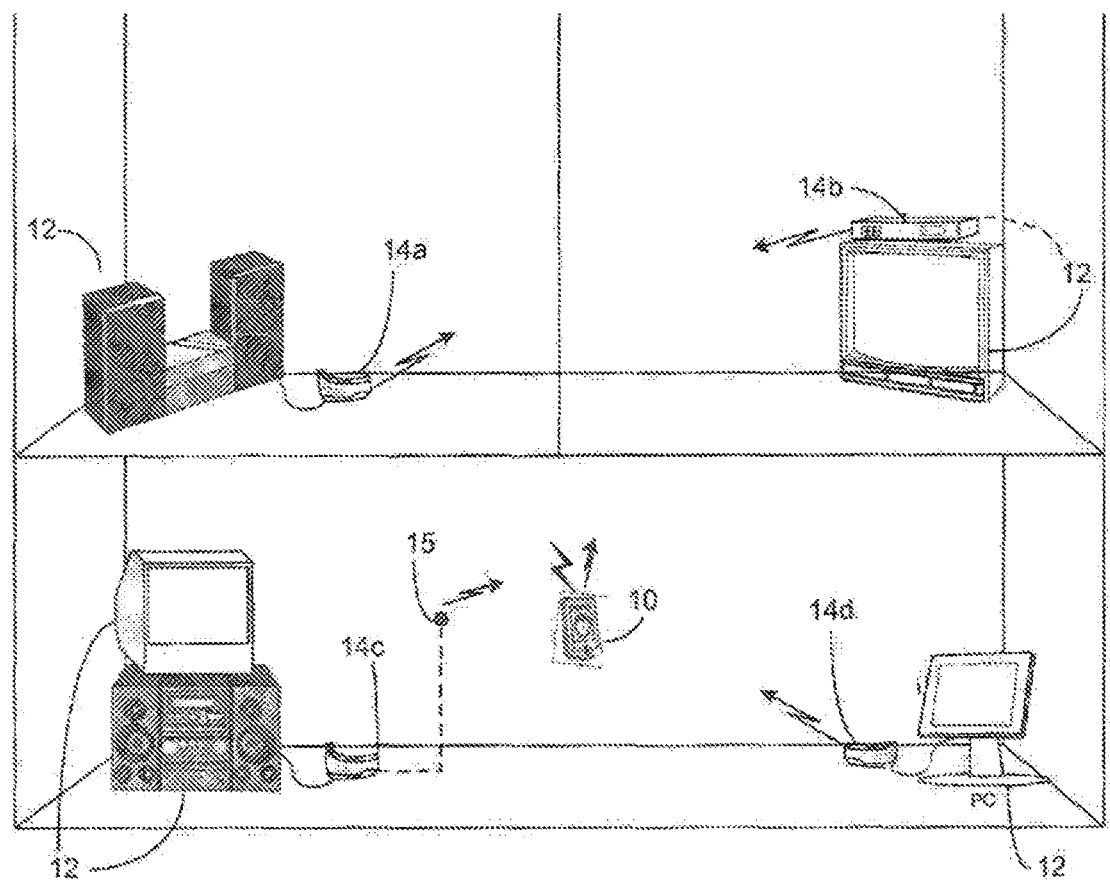
FIG. 1 illustrates an exemplary system employing a method for determining controlling device location.

Turning now to FIG. 1, an example system generally includes a controlling device 10 (e.g., a wireless, universal remote control) that is adapted to communicate with one or more home appliances 12 via use of signals transmitted on a BLE mesh network and which may be further adapted to transmit command codes, via the BLE mesh network and/or via use of another communications channel, to control the operation of the one or more home appliances 12. By way of example only, the appliances 12 can include, but are not limited to, televisions, VCRs, DVRs, DVD players, cable converter boxes, amplifiers, CD players, game consoles, home lighting, drapery, fans, HVAC systems, thermostats, personal computers, etc.

Figure 2:
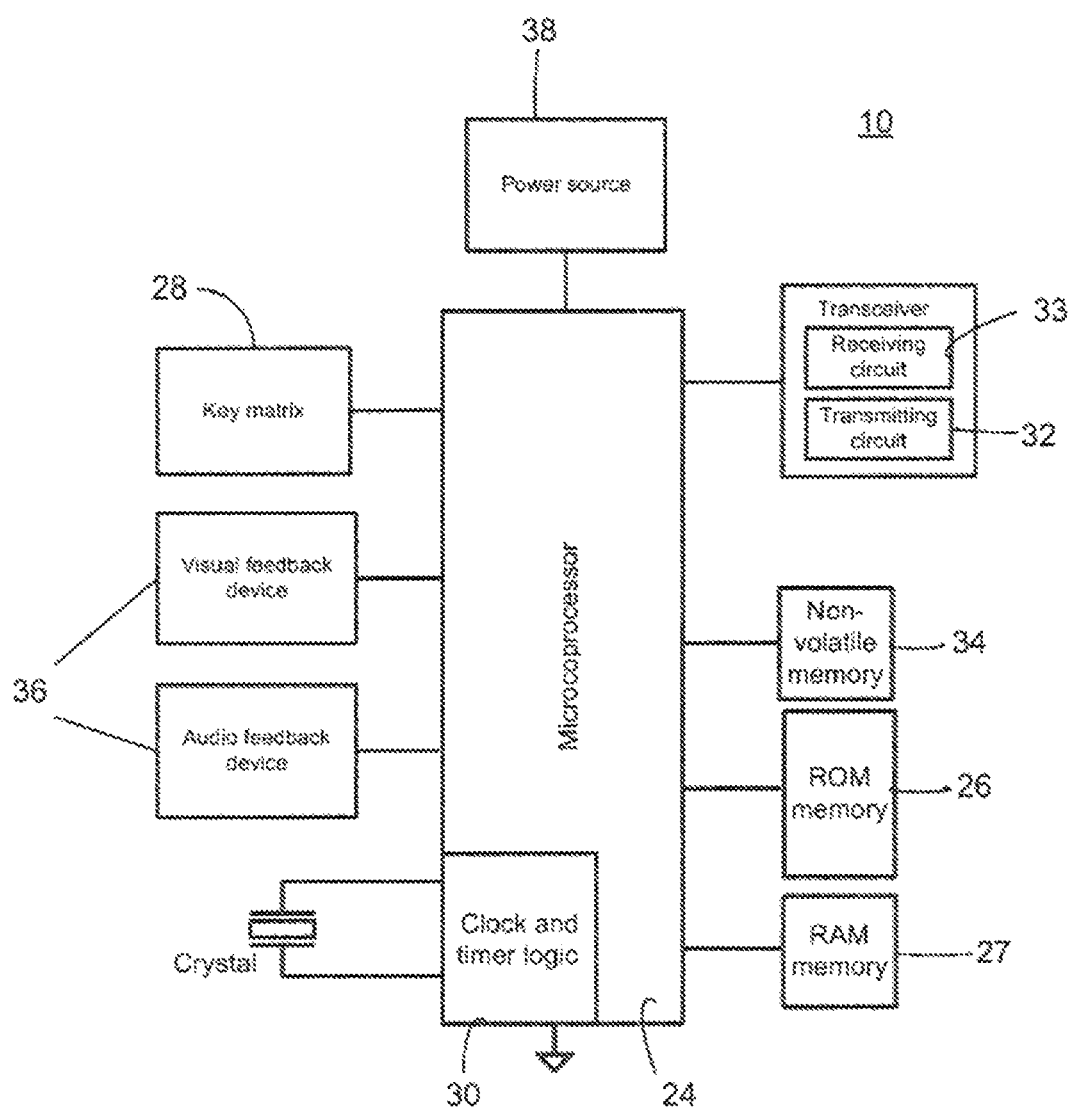
FIG. 2 illustrates a block diagram of components of an exemplary controlling device.

For use in communicating with (and possibly for transmitting command codes as desired) to one or more of the appliances 12, the controlling device 10 of the exemplary system may include, as needed for a particular application, a processor 24 coupled to a memory device (such as ROM memory 26, RAM memory 27, and a non-volatile memory 34), a key matrix 28 (e.g., physical buttons, a touch screen display, or a combination thereof), an internal clock and timer 30, transmission circuit(s) 32, receiver circuit(s) 33, and/or transceiver circuit(s) (e.g., BLE and possibly IR and/or RF), a means 36 to provide feedback to the user (e.g., LED, display, speaker, and/or the like), and a power supply 38 as generally illustrated in FIG. 2. As will be understood by those of skill in the art, the memory device may include executable instructions that are intended to be executed by the processor 24 to control the operation of the controlling device 10. In this manner, the processor 24 may be programmed to control the various electronic components within the controlling device 10, e.g., to monitor the power supply 38, to cause the transmission of signals, etc.

The non-volatile read/write memory 34, for example an EEPROM, battery-backed up RAM, Smart Card, memory stick, or the like, may be provided to store setup data and parameters as necessary. It is to be additionally understood that the memory devices may take the form of any type of readable media, such as, for example, ROM, RAM, SRAM, FLASH, EEPROM, Smart Card, memory stick, a chip, a hard disk, a magnetic disk, and/or an optical disk. Still further, it will be appreciated that some of or all of the illustrated memory devices 26, 27, and 34 may be physically incorporated within the same IC chip as the microprocessor 24 (a so called "microcontroller") and, as such, they are shown separately in FIG. 2 only for the sake of clarity.

To identify home appliances by type and make (and sometimes model) such that the controlling device 10 can be adapted to communicate with such appliances 12 (and possibly to transmit recognizable command codes in the format appropriate for such identified appliances 12), BLE communications can be used to facilitate the controlling device 10 receiving from an appliance 12 appliance identifying data, such as a Device ID Profile. Once such appliance identifying data is received from the controllable appliances 12, the controlling device 10 can set itself up to control the operation of specific home appliances, e.g., to present a user interface for accepting input to cause the controlling device 10 to transmit one or more commands to one or more of the appliances 12 using one or more protocols, such as IR, RF, BLE, etc, that will be recognized by an intended target appliance. As method for using data to set-up/configure a controlling device are well-known, such methods need not be described in greater detail herein. Nevertheless, for additional information pertaining to controlling device setup, the reader may turn to U.S. Pat. Nos. 4,959,810, 5,614,906, and 6,225,938, which patents are incorporated herein by reference in their entirety. Meanwhile, a method for using appliance identifying data to link a user interface for a virtual equivalent of a controllable appliance to an intended target appliance may be found in U.S. Pat. No. 9,632,665, the disclosure of which is also incorporated herein by reference in its entirety.

To cause the controlling device 10 to perform an action, the controlling device 10 is adapted to be responsive to events, such as a sensed user interaction with the key matrix 28, receipt of a data or signal transmission, etc. In response to an event, appropriate instructions within the memory 26 may be executed. For example, when a command key is activated on the controlling device 10, the controlling device 10 may retrieve a command code corresponding to the activated command key from memory 26 and transmit the command code to a device in a format recognizable by the device. Similarly, when data is received from the BLE mesh network that is indicative of an appliance being added to and/or removed from an environment which includes the controlling device 10, that is indicative of the controlling device 10 being introduced into a new environment, etc., the controlling device 10 may automatically respond to such an event by configuring itself to communicate with the appliances within the environment as described above. Accordingly, the instructions within the memory 26 can be used to cause the transmission of command codes and/or data to the appliances 12 and to perform local operations, e.g., location based features and functions, displaying information/data, favorite channel setup, macro button setup, function key relocation, etc. Examples of some of these local operations can be found in U.S. Pat. Nos. 5,481,256, 5,959,751, and 6,014,092, 6,225,938 and U.S. application Ser. Nos. 60/264, 767, 09/905,423, 09/905,432, and 09/905,396, each of which is incorporated herein by reference in its entirety.

As discussed above, the controlling device 10 preferably includes programming such that the location of the controlling device may be determined by one or more signals received by the controlling device 10. Given a determination of location, controlling device 10 may further include programming whereby command sets (i.e., device command codes mapped to various buttons of key matrix 28), controlling device states, favorite channel lineups, user interfaces, and/or macro commands are recalled from memory, made available from a home computer or Internet based data source, and/or dynamically generated (based on location data) such that desired commands or functions are presented to a user automatically. The methods for such automated command set recall and/or generation are described more fully in commonly assigned, U.S. Provisional Application 60/517,283, entitled "Home Appliance Control System and Methods in a Networked Environment," the disclosure of which is incorporated herein by reference in its entirety. Additional extended control functions may be implemented in conjunction with the current system and method, such as the ability to pause and resume appliance states across multiple control environments or zones, which is described more fully in commonly assigned, U.S. Application 60/517, 737, entitled "System And Method For Saving And Recalling State Data For Media And Home Appliances," the disclosure of which is also incorporated herein by reference in its entirety.

Figure 3:
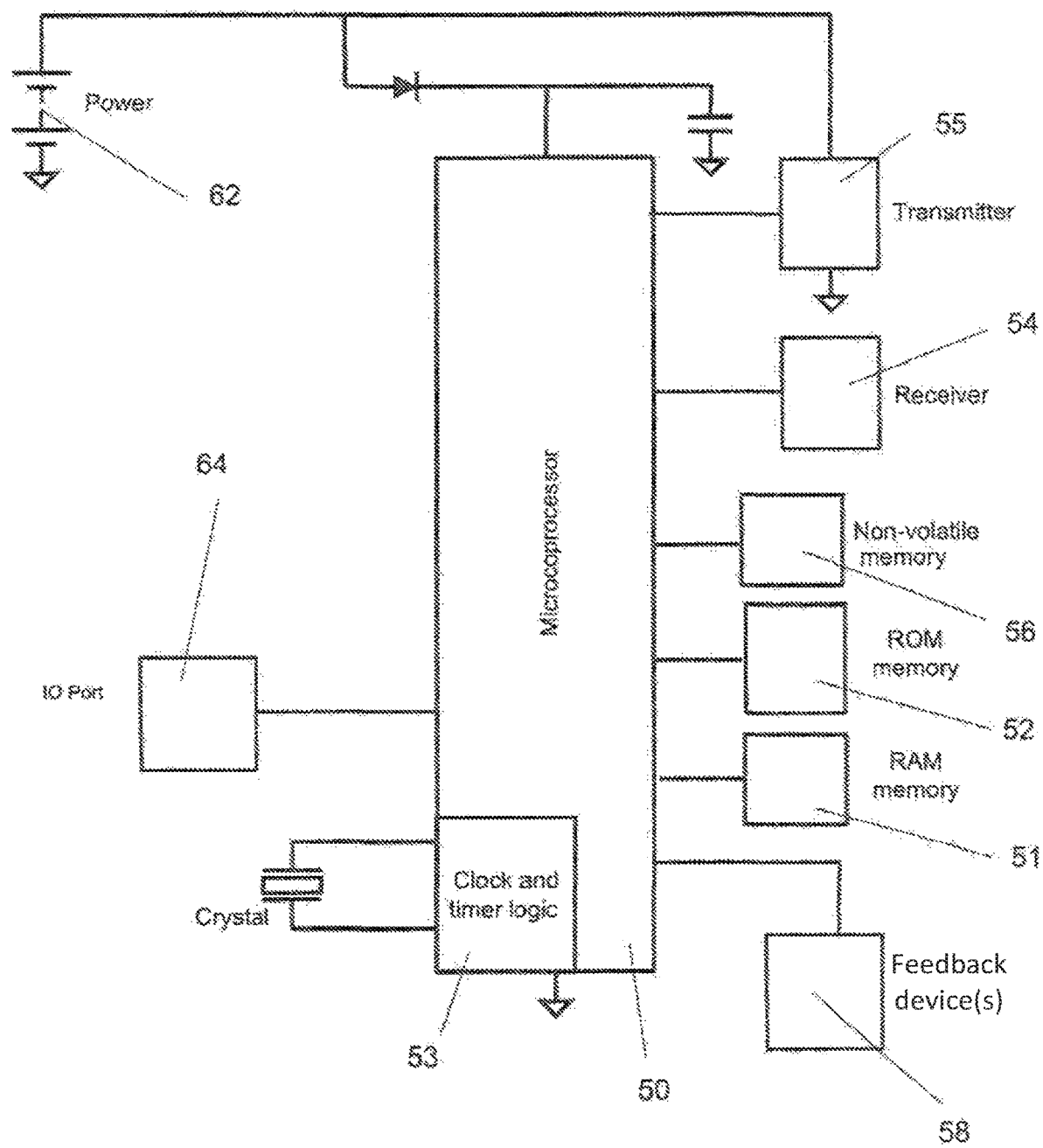
FIG. 3 illustrates a block diagram of components of an exemplary location signaling device.

To facilitate the provisioning of the above-noted environment/appliance identifying data to the controlling device 10, an exemplary system and method includes one or more BLE enabled signaling devices 14. The signaling device(s) 14 may be a device (e.g., 14a) separate and apart from the appliances 12 or may be integrated (e.g., 14b) into one or more of the appliances 12 as is illustrated in FIG. 1. Signaling device 14 may additionally be integrated with other extended function control devices. In any of these cases, the signaling device 14 may include, as needed for a particular application, a processor 50 coupled to a memory device (such as RAM memory 51, ROM memory 52, and/or non-volatile read/write memory 56), an internal clock and timer 53, receiver circuit(s) 54, transmission circuit(s) 55, and/or transceiver circuit(s) (e.g., BLE and IR and/or RF), a means 58 to provide feedback to the user (e.g., LED, display, speaker, and/or the like), a power supply 62, and communication means 64, (e.g., serial I/O port, Ethernet, 1394 firewire, wireless transceiver, etc.), as is generally illustrated in FIG. 3. The communication means 64 may be used to connect each signaling device 14 to a common home control unit (such as a control pod, server, HVAC, etc.) in order to enable communication and timing operations between all signaling devices.

The memory device may include executable instructions that are intended to be executed by the processor 50 to control the operation of the signaling device 14. In this manner, the processor 50 may be programmed to control the various electronic components within the signaling device 14, e.g., to monitor the power supply 62, to cause the transmission of signals to any further appliances, control devices etc. connected thereto, to provide audio or visual prompts to a user, etc. The non-volatile read/write memory 56, for example an EEPROM, battery-backed up RAM, Smart Card, memory stick, or the like, may also be provided to store setup data and parameters as necessary. While the memory 52 is illustrated and described as a ROM memory, memory 52 can also be comprised of any type of readable media, such as ROM, RAM, SRAM, FLASH, EEPROM, or the like. Preferably, the memory 56 is non-volatile or battery-backed such that data is not required to be reloaded after battery changes. In addition, the memories 51, 52 and/or 56 may take the form of a chip, a hard disk, a magnetic disk, and/or an optical disk. It will also be appreciated that in cases where signaling device capability is integrated into an appliance, some or all of the functional elements described above in conjunction with FIG. 3 may be combined with similar elements already present in the appliance for other purposes.

For transmitting and receiving information between controlling device 10 and the signaling device(s) 14a-d (as shown in FIG. 1), communications will be exchanged via use of the BLE mesh network. While not required, communication may also be performed using an IR protocol such as XMP (described in co-pending U.S. patent application Ser. No. 10/431,930) and/or a further RF protocol, such as RFID. All that is required is that the signaling device 14 be able to decipher a signal received directly or indirectly from the controlling device 10 and/or that the controlling device 10 be able to decipher a signal received directly or indirectly from the signaling device 14. At least the information received from a signaling device 14b via use of the BLE mesh network is to be used to discern the location or environment of controlling device 10.

More particularly, it is contemplated that the controlling device 10 will support BLE, e.g., BLE 5.1, mesh networks and will utilize other BLE mesh network devices 14 (e.g., temperature/humidity/light sensors, etc.) to determine its position. In this regard, angle of arrival ("AoA") direction finding functionality, angle of departure ("AoD") direction finding functionality, and received signal strength indicator (RSSI) functionality can be used to determine the controlling device 10 position within a building. Once the position of the controlling device 10 is known, for example with the position being triangulated from the angular information, then other functions within the building can be customized for the user's preferences. Examples would be for the system to use the location of the controlling device 10 to turn lights/music on and off as the user walks through the building, to unlock/lock doors, etc. To this end, the control signals could originate from the controlling device 10 itself or the location of the controlling device 10 can be used as an input event at a further controlling device to cause the further controlling device to command an action.

To support such functionality, it will be appreciated that the devices within the system are intended to communicate with each other will be provisioned with any hardware and software needed to support AoA, AoD, and RSSI.

The AoA method is used to determine a position of a RF transmitting device, e.g., a device having a transmitting BLE transceiver. The receiving device samples data from the signal packets while switching between each active antenna in an array. By doing so the receiving device detects the phase difference of the signal due to the difference in distance from each antenna in the array to the signal transmitting antenna. A positioning engine then uses the phase difference information to determine the angle from which the signals were received and hence the direction of the transmitting device relative to the receiving device.

In the AoD method, the device with the antenna array sends a signal via each of its antennas. As each signal from the antennas in the array arrives at the receiver's single antenna, it is phase shifted from the previous signal due to the different distance the signal has travelled from the transmitter. The receiving device can then use the data to determine the angle from which the signals were received and thereby the direction of the transmitting device relative to the receiving device.

RSSI is an estimated measure of power level that a RF client device is receiving from an access point or router. At larger distances, the signal gets weaker and the wireless data rates get slower, leading to a lower overall data throughput.

Within the described system, while it further contemplated that the controlling device 10 could auto-adapt to a new room by exchanging messages with the other devices 14 that are nearby, e.g., to configure the controlling device 12 to control one or more of the appliances 12 (e.g., TV, DVD, dimmable lights, temperature control for that room, etc.) and to provide suitable user interfaces for this purpose as desired, it will be understood that, by utilizing a combination of AoA/AoD, and RSSI, the system can calculate the position of the controlling device 10 in the building with high accuracy whereupon this information can be used for still further purposes.

By way of example, the controlling device 10 can use the precisely determined location of the controlling device 10 to adapt its display to only show commands that match the device that the controlling device 10 is pointing at, e.g., the controlling device 10 could bring up a menu to open and close a shade when it is determined that the controlling device 10 is pointing at a shade and change the display to lighting when it is determined that the controlling device 10 is pointing at a dimmable fixture.

For this purpose, the controlling device 10 can be programmed to send non-connectable advertising packets when it has data to send. The devices 14 would have to be using active scanning, and each device 14 would send a Scan Request packet. If there is only one target device 14, then the controlling device 10 would send target control codes in the Scan Response packet. If there were multiple target devices 14 sending Scan Response packets, then the controlling device 10 would use AoA to select the target device 14 that had an AoA closest to 90° (as determined by an antenna that is arranged appropriately relative to the front, pointing surface of the controlling device 10), which would mean that the controlling device 10 was pointing at that target device 14. The controlling device 10 would then be programmed to send control codes to that device, e.g., a controllable TV, via a Scan Response packet. The controlling device 10 may also cause a display of a user interface appropriate for the target device 14, e.g., a user interface having icons representative of controllable functions of a controllable TV.

It is also contemplated that the controlling device 10 would need to pair with the target devices 14 first. Once paired, the controlling device 10 can behave similar to conventional IR remotes by just simply sending the control codes without receiving an ACK or response from the target devices 14. To pair, the controlling device would send non-connectable advertising packets to let the target devices 14 know that it wants to pair/control them. The target devices 14 can use RSSI/AoA to determine advertising packets are intended for them and then try to pair with the remote by memorizing the Bluetooth Device (BD) address of the controlling device 10. Standard BLE pairing can also work but the controlling device/targets must disconnect a BLE link after paired. Once the target devices 14 memorize the BD address of the controlling device 10, the controlling device 14 can use either advertising extension or non-connectable advertising messages to send control codes to the target devices 14. For a single target control, that target can just simply acts upon receiving control codes from the controlling device. For multiple targets control, the target devices 14 would use AoA to determine that the control codes are intended for them, i.e., the controlling device 14 is being pointed at the intended target device 14. For all on/off or broadcast control codes, the target devices 14 would preferably not have to use AoA.

In these example, while custom user interfaces may be presented in a display of the controlling device 10 dependent upon the environment in which the controlling device 10 is located and/or dependent upon which device 14 the controlling device 10 is determined to be pointing at, it is also preferred that other menu items that are not location specific (e.g., building security settings, building temperature) would be always available for invocation on the controlling device 14. In addition, it is contemplated that, because the controlling device 10 and the system will know the location of the controlling device, the controlling device 10 and/or the system can be further programmed to provide navigation for the user. This would be useful for situations such as finding an emergency exit during an emergency, or in dark/smoky situations, finding a room at a large school/office/hospital, finding the location of a BLE sensor that needs a new battery, etc.

In the above systems, the controlling device 10 can be programmed to periodically poll for devices 14, the devices 14 can periodically announce their presence to the network, a network hub can periodically publish a device directory, or the like as desired to ensure that the controlling device 10 is, and continues to be, location and/or environment aware.

It will also be appreciated that the systems described herein could be adapted to locate the controlling device 10 within an environment by leveraging the BLE "Find Me" profile. In this scenario, the user would initiate a scan for the controlling device 10 from a host device (already on a local network with other authenticated devices). For example, a user could scan/search for the controlling device 10 by initiating the "Find Me" profile from a host device such as a TV or STB within an environment. The TV or STB would start to exchange messages between all devices on the network to locate the remote controller 10, e.g., by using angle detection and triangulation as discussed above.

To assist the user in getting to the located controlling device 10, the devices on this network would broadcast their proximity and direction in relation to the lost remote controller. In this scenario, a TV could indicate that its (1, 2, 3 feet . . . ) and (above/below/left/right) of the TV remote controller (peripheral). This information could be communicated to a user via use of a speaker, a displayed map, or the like. It is believed that this solution could be particularly useful in the hospitality industry, since remotes can easily be misplaced in rooms by guests, the room cleaning staff, etc.

It is also to be appreciated that the described systems could be used to synchronize and/or transfer content on location of the controlling device. For example, during initial setup/configuration of a whole home AV system, the location of the various devices can be saved in a controlling device profile. This information can then be utilized to enable content to follow the remote around the home. The user could be watching a live event on the living room TV (via STB server), and as the user and the controlling device 10 move to another room, the content can be transferred to that AV system in the bedroom. As above, such a system would rely upon that the devices direction-finding messages/data. This system need not be tied to video only, as it can also be used for whole-home audio, or other commercial settings, e.g., in a museum a user could use their BLE 5.1 equipped phone to get a customized experience based on their movement about the exhibits.

In a further example system, the BLE device 14 may be a BLE security camera that is adapted to support the sending of both high-resolution photos, and also video, using adaptive video compression. Preferably, the BLE security camera will transmit the photos or video when triggered by motion or some other event (sound, vibration, heat, car approaching, etc.). For some situations, still photos would be sufficient information, while others would require video. For example, reading license plates at a remote security gate would only require high-resolution still photos, while other situations would require video to determine what triggered an alarm. Depending on the distance to the security camera and other factors, there might not be sufficient bandwidth to send video, so the camera would send photos at the highest rate that the network supports. The security camera could initially send lower resolution black and white photos, and then switch to higher resolution color photos that would take longer to process and transmit. The camera would take into account the speed available using the BLE 5.0 PHY to send data at speeds that can vary from 125 Kbps to 2 Mbps.

With respect to the systems and methods have been described herein, it is understood that, unless otherwise stated to the contrary, one or more functions may be integrated in a single physical device or a software module in a software product, or one or more functions may be implemented in separate physical devices or software modules, without departing from the scope and spirit of the present disclosure. Ii will also be appreciated that detailed discussion of the actual implementation of each module is not necessary for an enabling understanding of the invention. The actual implementation is well within the routine skill of a programmer and system engineer, given the disclosure herein of the system attributes, functionality, and interrelationship of the various functional modules in the system. A person skilled in the art, applying ordinary skill can practice the present invention without undue experimentation. It will also be apparent to those skilled in the art that various modifications and improvements may be made without departing from the scope and spirit of the invention. Accordingly, it is to be understood that the invention is not to be limited by the specific illustrated embodiments.

All patents and applications for patent cited within this document are hereby incorporated by reference in their entirety.

What is claimed is:

1. A method for adapting a controlling device to control a one of a plurality of controllable appliances in an environment, comprising:
   receiving by the controlling device from each of a plurality of controllable appliances a scan request packet;
   using a radio frequency connection between the controlling device and the one of the plurality of controllable appliances in the environment to determine that the controlling device is pointing more towards the one of the plurality of controllable appliances relative to remaining ones of the plurality of controllable appliances; and
   automatically causing the controlling device to transmit one or more scan response packets having data obtained from the scan request packet received from the one of the plurality of controllable appliances and one or more control codes for commanding a one or more functional operations of the one of the plurality of controllable appliances.

2. The method as recited in claim 1, further comprising automatically causing the controlling device to make active a user interface usable for commanding functional operations of the one of the plurality of controllable appliances.

3. The method as recited in claim 2, wherein the user interface is stored in a memory of the controlling device before it is determined that the controlling device is pointing more towards the one of the plurality of controllable appliances relative to remaining ones of the plurality of controllable appliances.

4. The method as recited in claim 2, wherein the user interface is retrieved from a remote data store by the controlling device in response to it being determined that the controlling device is pointing more towards the one of the plurality of controllable appliances relative to remaining ones of the plurality of controllable appliances.

5. The method as recited in claim 1, wherein using a radio frequency connection between the controlling device and the one of the plurality of controllable appliances in the environment to device to determine that the controlling device is pointing more towards the one of the plurality of controllable appliances relative to remaining ones of the plurality of controllable appliances further comprises using an angle of arrival direction finding methodology.

6. The method as recited in claim 1, wherein using a radio frequency connection between the controlling device and the one of the plurality of controllable appliances in the environment to device to determine that the controlling device is pointing more towards the one of the plurality of controllable appliances relative to remaining ones of the plurality of controllable appliances further comprises using an angle of departure direction finding methodology.

7. The method as recited in claim 1, wherein the data obtained from the scan request packet received from the one of the plurality of controllable appliances comprises a device identifier received from the one of the plurality of controllable appliances.

8. The method as recited in claim 7, further comprising using the device identifier received from the one of the plurality of controllable appliances to determine a user interface to make active on the controlling device.

9. The method as recited in claim 1, wherein the controlling device and the plurality of controllable appliances communicate via use of a radio frequency, mesh network.

10. The method as recited in claim 1, further comprising transmitting by the controlling device a non-connectable advertising packets prior to the controlling device receiving from each of the plurality of controllable appliances the scan request packet.

* * * * *